United States Patent Office 2,777,835
Patented Jan. 15, 1957

2,777,835

POLYMERIZATION OF 1-CHLORO-1-FLUORO-ETHYLENE

John D. Calfee, Dayton, Ohio, assignor to Monsanto Chemical Company, St. Louis, Mo., a corporation of Delaware No Drawing. Application November 22, 1952,
Serial No. 322,157

7 Claims. (Cl. 260—92.1)

This invention relates to the homopolymerization of 1-chloro-1-fluoroethylene, also known as vinylidene chlorofluoride. In one aspect the invention pertains to the employment of extremely high pressures resulting in the production of a greatly improved homopolymer of 1-chloro-1-fluoroethylene. In accordance with preferred embodiments of the invention, homopolymers of 1-chloro-1-fluoroethylene are produced which have increased toughness, molecular weight, resistance to flow at elevated temperatures, and hot mill processability.

1-chloro-1-fluoroethylene is a unique monomer. Polymers thereof have many properties which are markedly different from polymers of closely related compounds such as vinyl fluoride, vinylidene chloride, vinyl chloride, or vinylidene fluoride. The polymerization of vinylidene chlorofluoride is taught in U. S. Patent 2,362,094, and polymers made in accordance with the specific teachings of that patent have very valuable attributes. The present invention is a specific improvement in the art of polymerizing vinylidene chlorofluoride.

An object of this invention is to polymerize 1-chloro-1-fluoroethylene. Another object of the invention is to effect the homopolymerization of vinylidene chlorofluoride at conditions which result in greatly improved physical properties of the polymer. A further object is to effect the homopolymerization of vinylidene chlorofluoride employing extremely small quantities of catalyst. Yet another object is to reduce greatly the time required for obtaining a high conversion of vinylidene chlorofluoride to high molecular weight polymer. A yet further object is to increase the softening point and processability of vinylidene chlorofluoride homopolymers. Another object is to increase the molecular weight of vinylidene chlorofluoride polymers. Further objects and advantages of the invention will be apparent to one skilled in the art from the accompanying disclosure and discussion.

In accordance with my invention, the homopolymerization of vinylidene chlorofluoride is carried out at a pressure of at least 5,000 pounds per square inch. I have found that by employing such pressures and preferably pressures of at least 15,000 pounds per square inch, the catalyst requirement is reduced, for example, to about $\frac{1}{20}$ that necessary for polymerizing vinylidene chlorofluoride at its autogenous pressure. Yet even using such greatly reduced quantity of catalyst still permits the polymerization to be carried out to a high conversion in a much shorter time, for example, $\frac{1}{3}$ the time needed for polymerization at autogenous pressure. Not only are these benefits obtained, but the product itself made as the high pressures is greatly improved in several properties over the polymer made at autogenous pressure. Thus, the polymer is tougher, higher in molecular weight, has greater resistance to flow at elevated temperatures, and is easily processed on a hot mill. By way of example and in contrast to the foregoing, vinylidene chlorofluoride polymerized at its autogenous pressure, i. e., below a few hundred pounds per square inch, usually requires a reaction time of about 48 hours to yield a high conversion to polymer, and the reaction temperature needs to be kept below about 60° C. and catalyst concentration below 0.15 weight percent to obtain a completely colorless product having at least moderate molecular weight. When the polymer is prepared under these conditions, it has a softening point of, say, 85° C. but processes very poorly on a hot mill (150° C.). It may be too soft, or quite surprisingly fail to form a continuous band.

In accordance with my invention, a monomeric material consisting of 1-chloro-1-fluoroethylene is polymerized at a pressure of at least 5,000 and preferably 15,000 pounds per square inch. I prefer to operate at pressures of about 35,000 to 40,000 pounds per square inch and, even much higher, say, up to 200,000 pounds per square inch and above.

While my process can be effected over a fairly wide range of temperature, the temperature should be sufficient to give a reasonable reaction rate, yet not so high as to cause decomposition of monomer or polymer with resultant discoloration of the product. Temperatures within the range of 0 to 150° C. can be used, taking into consideration the foregoing requirements, but temperatures of from 50° to 100° C. are ordinarily entirely satisfactory and preferred.

As mentioned above, one of the important advantages of this invention is the reduction in time required to obtain a high yield of polymer. In batch polymerizations, reaction times can be chosen within the range of 1 to 24 hours or longer, the particular choice being readily made by one skilled in the art having had the benefit of the present disclosure, and being dependent upon the pressure employed, the purity of the monomer, and the amount and kind of catalyst used. In a continuous system wherein the reaction mixture is continuously flowed through a tubular or other reactor at conditions effecting the desired polymerization, the residence time at reaction conditions is generally considerably shorter than in the case of a batch reaction; thus reaction times of 5 minutes to 1 hour or more are often adequate in continuous flow polymerizations. In either batch or continuous type of operation, any unreacted monomer is of course recovered and recycled to the reaction, being subjected to purification if desired prior to its return to the reaction zone.

The vinylidene chlorofluoride to be subjected to homopolymerization according to this invention should be of high purity. It has been found that extremely small amounts of impurities exhibit in many cases detrimental effects on the rate of reaction and/or the properties of the polymer. Thus, vinylidene chlorofluoride is preferably subjected to sufficient purification, as by careful fractional distillation, together with chemical treatment, if necessary, to produce a monomer containing not in excess of 25 parts per million of any one impurity. This requirement is particularly important with respect to highly reactive impurities such as acetylene, hydrogen sulfide, carbon monoxide, or oxygen. However, oxygen can be employed as the polymerization catalyst in small amounts ranging up to 100 to 200 parts per million and in such case it, of course, is not to be considered as an impurity. However, where other types of catalyst are used, it is often desirable to maintain a very low oxygen content in the monomer.

Sufficient catalyst is employed to give a reasonable reaction rate. Suitable catalysts are of the free radical-promoting type, principal among which are peroxide-type polymerization catalysts, and azo-type polymerization catalysts. Those skilled in the art are now fully familiar with a large number of peroxide-type polymerization catalysts and a suitable one can readily be chosen by simple trial. Such catalysts can be inorganic or organic, the latter having the general formula R'OOR", wherein R' is an organic radical and R" is an organic radical or hydrogen. These compounds are broadly termed peroxides, and in a more specific sense are hydroperoxides when R'' is hydrogen. R' and R'' can be hydrocarbon radicals or organic radicals substituted with a great variety of substituents. By way of example suitable peroxide-type catalysts include: benzoyl peroxide, tertiary butyl peroxide, tertiary butyl hydroperoxide, diacetyl peroxide, diethyl peroxycarbonate, dimethylphenyl hydroperoxymethane (also known as cumene hydroperoxide) among the organic peroxides; hydrogen peroxide, potassium persulfate, perborates and other "per" compounds among the inorganic peroxides. The azo-type polymerization catalysts are also well-known to those skilled in the art. These are characterized by the presence in the molecule of the group —N=N—; the dangling valences can be attached to a wide variety of organic radicals. By way of example of suitable azo-type catalysts can be mentioned $\alpha,\alpha'$-azodiisobutyronitrile, diazoaminobenzene, azobis-(diphenylmenthane). The peroxytype or azo-type polymerization catalyst is used in small but catalytic amounts, which are generally not in excess of 1 percent by weight based upon the monomeric mixture. A suitable quantity is often in the range of 0.001 to 0.5 percent by weight.

While vinylidene chlorofluoride essentially free from other unsaturated materials is to be used in the process, the initial reaction mixture will usually also comprise a catalyst in small quantity, and may or may not further include a non-reacting fluid reaction medium. Thus, the polymerization can be effected in the presence of water which will aid in absorbing the exothermic heat of polymerization. With suitable agitation as by stirring in a batch reactor or turbulent flow in a continuous reactor, the water can act to suspend monomer and polymer during the course of the reaction and serve to carry the product through a continuous reaction zone for more ready ultimate recovery. Suspending or emulsifying agents can be added when water is employed, in quantities sufficient to enhance the suspension of monomer and polymer or even form an emulsion thereof. It is usually preferred to obtain the polymer in a form readily separable from the aqueous carrying liquid so that such added suspending or emulsifying agents are ordinarily not used. Suitable proportions of water are, for example, from 0.5 to 5 parts by weight per part of vinylidene chlorofluoride. Instead of or even in addition to water, non-reacting organic liquid reaction media can be used. Since the polymer produced in accordance with this invention is readily soluble in a large number of organic solvents, most liquid organic reaction media will partially or completely dissolve the polymer product and thus are quite useful in a continuous flow polymerization system. However, in many instances the molecular weight will be lowered considerably by using a solvent. As suitable solvents can be mentioned by way of example acetone, benzene, xylene, cyclohexanone, dioxane, methyl ethyl ketone. If a solvent or non-solvent liquid organic reaction or carrying medium is to be used, ordinarily at least 1 part by weight per part of vinylidene chlorofluoride up to 5 or 10 parts of the former will be suitable.

The following examples are presented to illustrate some of the preferred methods of carrying out this invention and some of the advantages thereof.

EXAMPLE 1

Data given in this example illustrate some of the marked differences in the polymerization itself and in properties of the polymer, between the use of autogenous pressure and the use of a pressure of 40,000 pounds per square inch.

The thermal properties, i. e., softening point, melting point, decomposition point and etching point, of the polymers as set forth in this example and in Examples 2 and 3, were determined by the following test procedure.

*Copper bar thermal properties*

This is an adaptation of the Maquenne block test, performed on a copper bar in the manner of Dennis and Shelton, Jour. Amer. Chem. Soc. 52, 3128 (1930); see "The Chemistry of Synthetic Resins," vol. II, Carleton Ellis, Reinhold Publishing Corp., 1935, page 1264. The test is performed on a copper bar which is heated at one end and cooled at the other, thus forming a surface whose temperature varies along the bar between these extremes. Thermometers are mounted in the bar at intervals to determine the temperature of the individual parts. Small particles of the polymer to be tested are sprinkled in a thin layer along the bar. After ten minutes the following observations are made.

S. P.—Softening point: This is determined by brushing the sample with a bristle from a paint brush. The lowest temperature at which the sample just begins to stick to the bar is taken as the softening point.

M. P.—Melting point: The lowest temperature at which the particles begin to lose their shape is taken as the melting point.

D. P.—Decomposition point: The lowest temperature at which discoloration begins, either of the particles or of the melted material, is taken as the decomposition point.

E. P.—Etch point: The lowest temperature at which the samplet begins to attack the copper bar is taken as the etch point.

*Properties of vinylidene chlorofluoride homopolymer*

| | Made at Autogenous Pressure (About 200 p. s. i.) | Made at 40,000 p. s. i. |
|---|---|---|
| Catalyst_____percent__ | 0.1 | 0.005 |
| Time_____hours__ | 48 | 16 |
| Tensile strength (p. s. i.)_____ | <200 | 510 |
| Elongation_____percent__ | >1,000 | 830 |
| Specific Viscosity (0.1% solution in dimethylformamide) _____ | 0.136 | 0.280 |
| Copper Bar Softening Point _____degrees centigrade__ | <95 | >125 |

EXAMPLE 2

Further comparisons are given in the table below on the effect of pressure on the preparation and properties of polyvinylidene chlorofluoride. In these runs, as well as those reported above in Example 1, vinylidene chlorofluoride of high purity was the sole monomer.

*Effect of pressure on preparation and properties of polyvinylidene chlorofluoride*

| Run No. | Porofor[1] Catalyst Conc. (Percent) | Temp., °C. | Press., p. s. i. | Time, Hrs. | Percent Yield | Tensile Properties | | Copper Bar Thermal Properties | | Specific Viscosity[2] |
|---|---|---|---|---|---|---|---|---|---|---|
| | | | | | | Tensile | Elong. | S. P. | M. P. | |
| A | 0.1 | 45 | <200 | 66 | 90 | <200 | >1,000 | <100 | <150 | 0.152 |
| B | 0.05 | 55 | 15,000 | 21 | 90 | 200 | >1,000 | 94 | 150 | |
| C | 0.006 | 90 | 40,000 | 16 | 60 | 512 | 833 | 125 | >175 | 0.280 |
| D | 0.006 | 40 | 40,000 | 72 | 90 | 380 | 1,000 | 175 | >175 | 0.211 |

[1] $\alpha,\alpha'$—Azodiisobutyronitrile.
[2] 1% solution in dimethylformamide at 25° C.
S. P. is softening point, ° C.
M. P. is melting point, ° C.

EXAMPLE 3

Additional data are given hereinbelow on the high pressure homopolymerization of vinylidene chlorofluoride.

*High pressure homopolymerization of vinylidene chlorofluoride*

| Run No. | Wt. VCF (g.) | Porofor [1] Catalyst Conc. (Percent) | Temp. (° C.) | Time, Hrs. | Press. (p. s. i.) | Yield (Percent) |
|---|---|---|---|---|---|---|
| E | 50 | 0.01 | 55 | 17 | 35,000 | 90+ |
| F | 75 | 0.007 | 55 | 17½ | 40,000 | 90+ |

[1] α,α'-Azodiisobutyronitrile.

*Physical properties of polyvinylidene chlorofluoride made at high pressures*

| Run No. | Copper Bar Thermal Data (° C.) | | | | Tensile Test Data | | Density |
|---|---|---|---|---|---|---|---|
| | S. P. | M. P. | D. P. | E. P. | Strength (p. s. i.) Fail | Percent Elong. Fail | |
| E | 170 | ------ | 185 | 200 | 1,450 | 1,440 | 1.693 |
| F | 170 | 225 | 200 | 200 | 1,010 | 1,220 | 1.698 |

Thermal data obtained from heated copper bar:
S. P.—Softening point.
M. P.—Melting point.
D. P.—Decomposition point.
E. P.—Etching point.
Tensile test run at 25° C., relative humidity of 50%, rate of jaw separation 5 in./min.

The products of Runs E and F were soluble in acetone, benzene, cyclohexanone, dioxane, dimethyl formamide, ethyl acetate, ethylene dichloride, methyl ethyl ketone, 2-nitropropane, and xylene.

Products of Runs E and F showed 100 percent recovery in tensile tests when stretched to just short of the breaking point. This and other properties demonstrate the excellent rubbery characteristics of polymers made in accordance with the invention. Another noteworthy property is the ability to adhere to many types of surfaces, the adherence to glass being particularly valuable.

This application is related to my copending application, Serial No. 322,158, filed November 22, 1952, which is directed to the copolymerization of vinyl chloride with 1-chloro-1-fluoroethylene at high pressures.

The invention has been described herein with particular reference to certain of its preferred aspects. However, numerous variations will occur to those skilled in the art and can be used without departing from the invention.

I claim:

1. A process which comprises polymerizing a monomeric material consisting of 1-chloro-1-fluoroethylene at conditions including the presence of a free radical promoting catalyst, a temperature within the range of 0° C. to 150° C., and a pressure of at least about 35,000 pounds per square inch producing a solid homopolymer of 1-chloro-1-fluoroethylene having, in comparison with homopolymer produced at autogenous pressure of liquid 1-chloro-1-fluoroethylene, increased toughness, molecular weight, resistance to flow at elevated temperatures, and hot mill processability, and having a copper bar softening point of at least 125° C.

2. A process according to claim 1 wherein said conditions include a time sufficient to convert at least about 90 percent of said 1-chloro-1-fluoroethylene to said solid homopolymer.

3. A process according to claim 1 wherein said polymerizing is effected in the presence of a catalyst selected from the group consisting of azo and peroxy polymerization catalysts.

4. A process according to claim 3 wherein said catalyst is α,α'-azodiisobutyronitrile.

5. A process which comprises continuously flowing through a reaction zone maintained at temperatures within the range of 50° C. to 100° C. and at pressures of at least about 35,000 pounds per square inch, a reaction mixture comprising a monomer consisting of 1-chloro-1-fluoroethylene, a catalyst for the polymerization of 1-chloro-1-fluoroethylene, and a non-reacting fluid reaction medium, and recovering from the effluent of said reaction zone a solid homopolymer of 1-chloro-1-fluoroethylene having, in comparison with homopolymer produced at autogenous pressure of liquid 1-chloro-1-fluoroethylene, increased toughness, molecular weight, resistance to flow at elevated temperatures, and hot mill processability, and having a copper bar softening point of at least 125° C.

6. A process according to claim 5 wherein said medium is an organic liquid solvent for poly-1-chloro-1-fluoroethylene.

7. A solid homopolymer of 1-chloro-1-fluoroethylene made by the process of claim 1 having, in comparison with homopolymer produced at autogenous pressure of liquid 1-chloro-1-fluoroethylene, increased toughness, molecular weight, resistance to flow at elevated temperatures, and hot mill processability, and having a copper bar softening point of at least 125° C.

References Cited in the file of this patent

UNITED STATES PATENTS

| 1,952,116 | Bridgman | May 27, 1934 |
| 2,362,094 | Renoll | Nov. 7, 1944 |
| 2,435,537 | Ford | Feb. 3, 1948 |
| 2,567,956 | Miller | Sept. 18, 1951 |

FOREIGN PATENTS

| 570,941 | Great Britain | July 30, 1945 |

OTHER REFERENCES

J. Polymer Sci. X, 149–155 (February 1953).